United States Patent
Mao et al.

(10) Patent No.: US 10,795,706 B2
(45) Date of Patent: Oct. 6, 2020

(54) MULTITIER APPLICATION BLUEPRINT REPRESENTATION IN OPEN VIRTUALIZATION FORMAT PACKAGE

(71) Applicant: VMware, Inc., Palo Alto, CA (US)

(72) Inventors: Dehui Mao, Shanghai (CN); Ping Chen, Shanghai (CN); Yuanzhi Wang, Shanghai (CN); Wei Zhang, Shanghai (CN); Li Fang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 476 days.

(21) Appl. No.: 15/175,004

(22) Filed: Jun. 6, 2016

(65) Prior Publication Data

US 2017/0351535 A1 Dec. 7, 2017

(51) Int. Cl.
*G06F 9/455* (2018.01)

(52) U.S. Cl.
CPC .. *G06F 9/45533* (2013.01); *G06F 2009/4557* (2013.01); *G06F 2009/45562* (2013.01)

(58) Field of Classification Search
CPC .... G06F 9/45504; G06F 8/60; G06F 9/45558; G06F 2009/45562; G06F 2009/4557
See application file for complete search history.

(56) References Cited

U.S. PATENT DOCUMENTS

| | | | |
|---|---|---|---|
| 9,201,639 B2 * | 12/2015 | Kumar | G06F 8/61 |
| 9,633,381 B2 | 4/2017 | McKerlich et al. | |
| 9,853,861 B2 * | 12/2017 | Mazhar | H04L 41/0806 |
| 9,984,428 B2 | 5/2018 | Doyle et al. | |
| 10,356,206 B2 | 7/2019 | Chen et al. | |
| 2008/0091837 A1 | 4/2008 | Langen et al. | |
| 2009/0177567 A1 | 7/2009 | McKerlich et al. | |
| 2010/0003923 A1 | 1/2010 | McKerlich et al. | |
| 2010/0250730 A1 | 9/2010 | Menzies et al. | |
| 2011/0313966 A1 | 12/2011 | Schmidt et al. | |
| 2012/0054324 A1 | 3/2012 | Tada et al. | |
| 2012/0066670 A1 | 3/2012 | McCarthy et al. | |
| 2013/0060838 A1 | 3/2013 | Yaffe | |
| 2013/0232463 A1 | 9/2013 | Nagaraja et al. | |
| 2013/0232480 A1 | 9/2013 | Winterfeldt et al. | |
| 2013/0232497 A1 * | 9/2013 | Jalagam | G06F 9/5072 718/104 |

(Continued)

OTHER PUBLICATIONS

Galan et al, Autoconfiguration of Enterprise-class Application Deployment in Virtualized Infrastructure Using OVF Activation Mechnisms, IFIP, 2012, pp. 414-421.*

(Continued)

*Primary Examiner* — Diem K Cao
(74) *Attorney, Agent, or Firm* — Su IP Consulting

(57) ABSTRACT

A method to deploy a multitier application in a virtualized computing environment includes receiving an open virtualization format (OVF) package. The OVF package includes an OVF descriptor, one or more virtual disk image files of virtual machines, and a multitier application blueprint specifying software components on the virtual machines and dependencies of the software components. The method further includes deploying the virtual machines based on the OVF package and executing the multitier application blueprint by deploying the software components on the virtual machines pursuant to the dependencies of the software components.

19 Claims, 5 Drawing Sheets

(56) References Cited

U.S. PATENT DOCUMENTS

| | | |
|---|---|---|
| 2013/0232498 A1 | 9/2013 | Mangtani et al. |
| 2014/0181816 A1* | 6/2014 | Muller ................ G06F 9/5022 |
| | | 718/1 |
| 2015/0134792 A1* | 5/2015 | Zhang ................ H04L 67/1002 |
| | | 709/221 |
| 2015/0261514 A1 | 9/2015 | Fu et al. |
| 2015/0378716 A1 | 12/2015 | Singh et al. |
| 2015/0381711 A1 | 12/2015 | Singh et al. |
| 2016/0034315 A1 | 2/2016 | Soejima |
| 2016/0094483 A1 | 3/2016 | Johnston et al. |
| 2016/0218938 A1* | 7/2016 | Gupte ................ H04L 41/5025 |
| 2016/0364554 A1 | 12/2016 | Lincoln et al. |
| 2017/0048314 A1 | 2/2017 | Aerdts et al. |
| 2017/0134301 A1 | 5/2017 | Chen et al. |
| 2018/0048314 A1 | 2/2018 | Zhang |
| 2019/0065165 A1 | 2/2019 | Troutman et al. |

OTHER PUBLICATIONS

Oracle, Oracle Virtual Assembly Builder, 2012, 5 pages.*

* cited by examiner

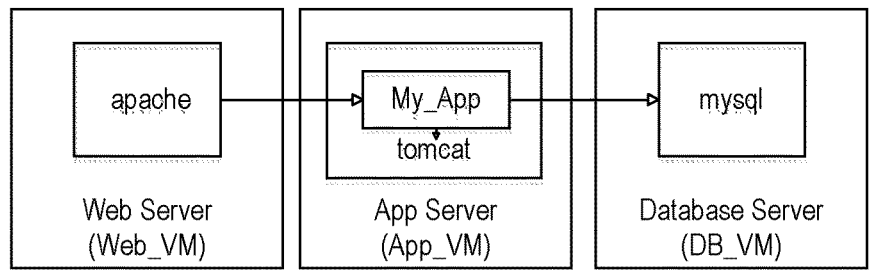
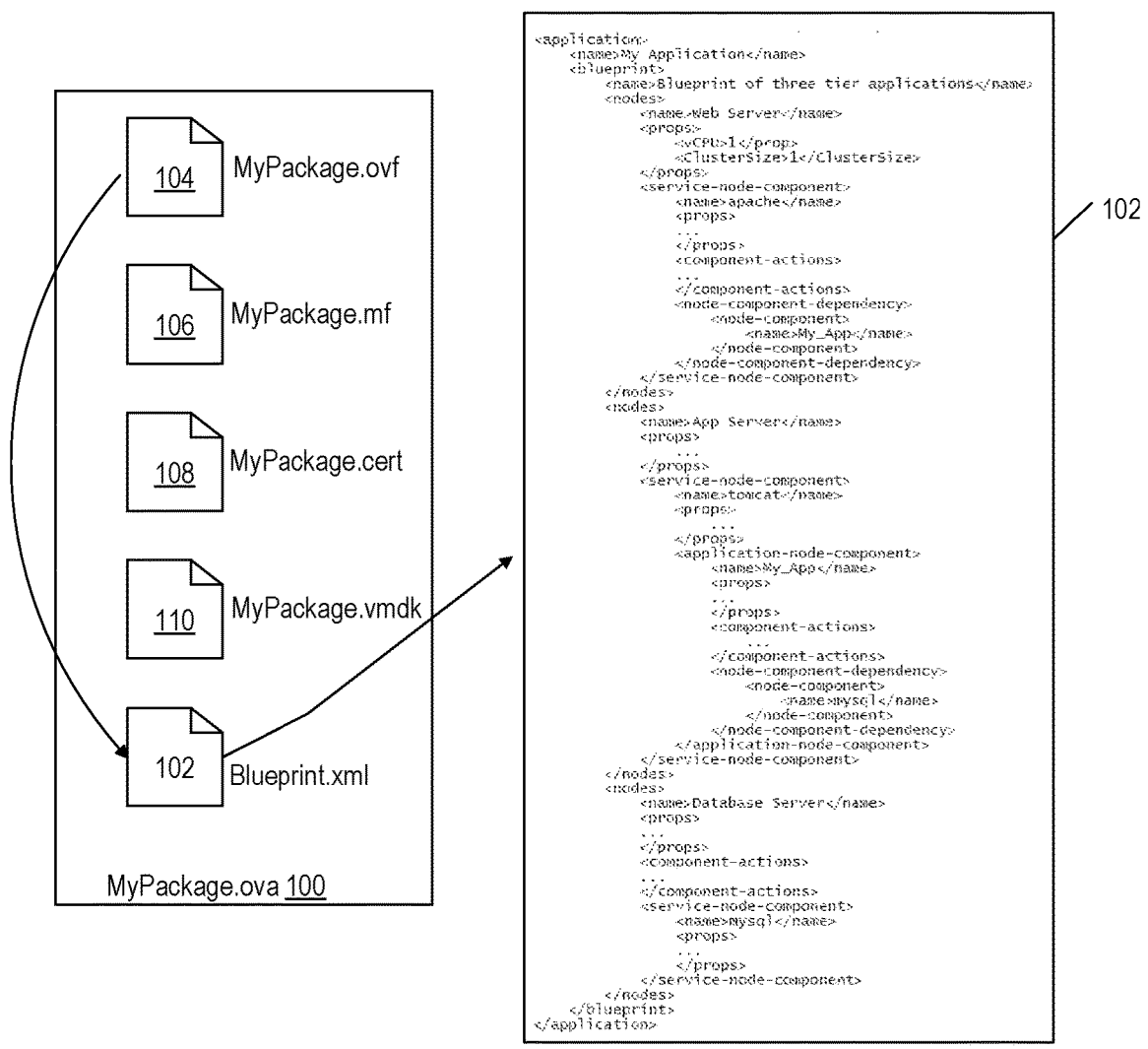
FIG. 1 blueprint-sample

```
102
    <application>
        <name>My Application</name>
        <blueprint>
            <name>Blueprint of three tier applications</name>
            <nodes>
                <name>Web Server</name>
                <props>
                    <vCPU>1</prop>
                    <ClusterSize>1</ClusterSize>
                </props>
                <service-node-component>
                    <name>apache</name>
                    <props>
                    ...
                    </props>
                    <component-actions>
                    ...
                    </component-actions>
                    <node-component-dependency>
                        <node-component>
                            <name>My_App</name>
                        </node-component>
                    </node-component-dependency>
                </service-node-component>
            </nodes>
            <nodes>
                <name>App Server</name>
                <props>
                ...
                </props>
                <service-node-component>
                    <name>tomcat</name>
                    <props>
                    ...
                    </props>
                    <application-node-component>
                        <name>My_App</name>
                        <props>
                        ...
                        </props>
                        <component-actions>
                        ...
                        </component-actions>
                        <node-component-dependency>
                            <node-component>
                                <name>mysql</name>
                            </node-component>
                        </node-component-dependency>
                    </application-node-component>
                </service-node-component>
            </nodes>
            <nodes>
                <name>Database Server</name>
                <props>
                ...
                </props>
                <component-actions>
                ...
                </component-actions>
                <service-node-component>
                    <name>mysql</name>
                    <props>
                    ...
                    </props>
                </service-node-component>
            </nodes>
        </blueprint>
    </application>
```

FIG. 2

MULTITIER APPLICATION BLUEPRINT REPRESENTATION IN OPEN VIRTUALIZATION FORMAT PACKAGE

BACKGROUND

Open virtualization format (OVF) is an open standard for packaging and distributing virtual appliances or more generally software that run in virtual machines. By packaging virtual appliances in OVF, independent software vendors can create a single, pre-packaged appliance that runs customers' virtualization platforms of choice.

BRIEF DESCRIPTION OF THE DRAWINGS

FIG. 1 is a block diagram illustrating an OVF package in examples of the present disclosure.

FIG. 2 is a table listing a multitier application blueprint in the OVF package of FIG. 1 in examples of the present disclosure.

DETAILED DESCRIPTION

Figure 3:
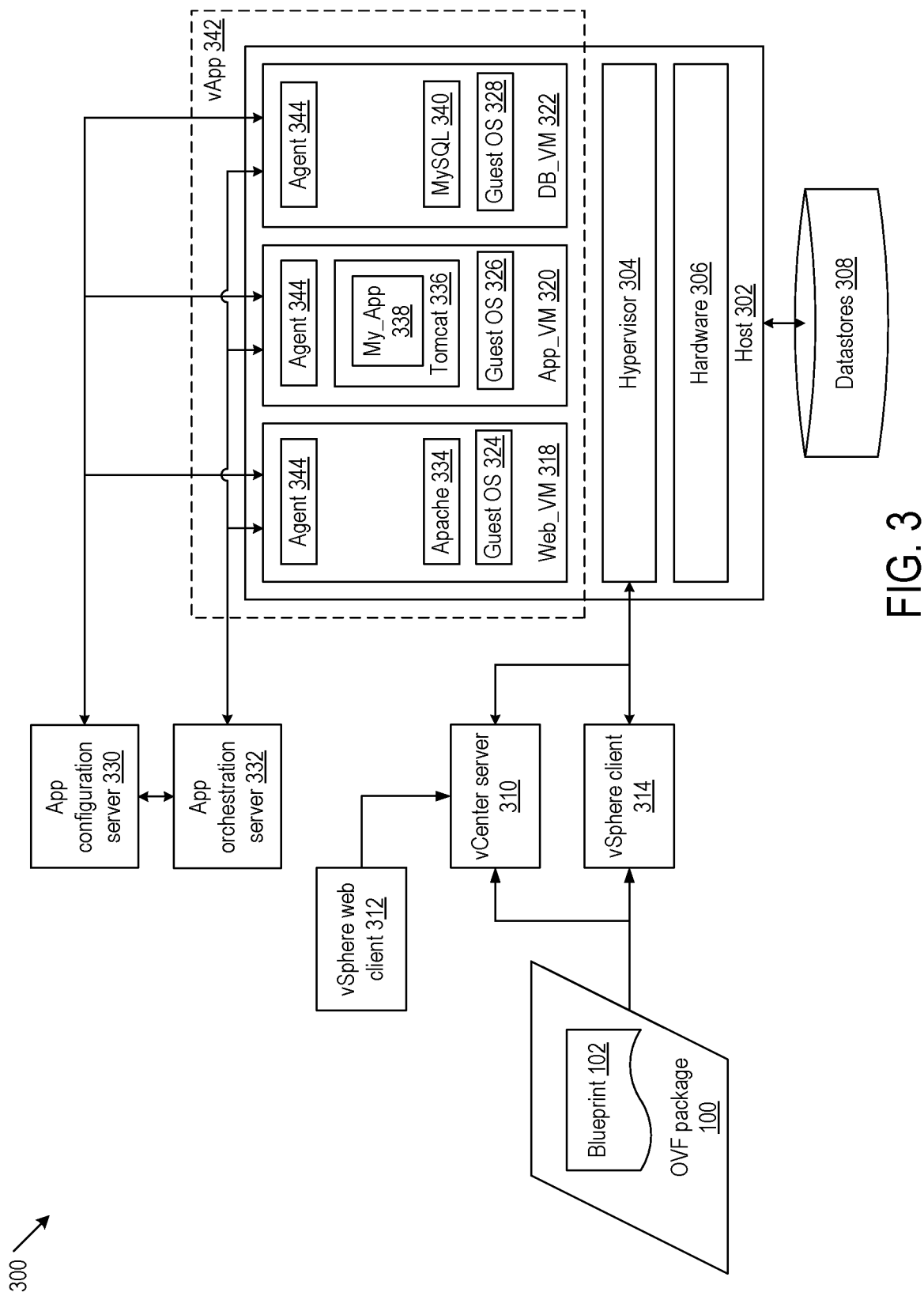
FIG. 3 is a block diagram of a virtualized computing environment in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

An open virtualization format (OVF) package includes an OVF descriptor, zero or one manifest, zero or one certificate, zero or more disk image files, and zero or more additional resource files, such as ISO images. The OVF descriptor (.ovf) is the main document of an OVF package. It stores metadata about the package and its contents. The manifest (.mf) and certificate (.cert) files are optional and they are used to check integrity and authenticity. The manifest file contains the SHA1 digest of all files in the package (except for the .mf and .cert files themselves), and the certificate file contains a signed digest for the manifest file and a X.509 certificate. The disk image files may be any disk format, such as VMDK disk image files. An OVF package may be stored as a set of files, for example on a standard Web server. An OVF package may also be stored as a single file using the TAR format. The extension of that file shall be .ova (open virtual appliance).

An OVF package only has virtual machine-level information, which presents the following disadvantages. First, the OVF package does not have application-level information. Application-level information includes the applications in each virtual machine (VM) as well as dependencies across different VMs in the OVF package. In a multi-VM deployment, installing applications and managing their dependencies is very time consuming. Second, the content of an OVF package is static as everything inside a VM is preconfigured. After OVF deployment, a user still needs to update the guest operating system (OS) and applications. Third, the size of an OVF package is usually large. VMs cannot share disk image files as their content is static and different VMs have different OS's and applications.

FIG. 1 is a block diagram illustrating an OVF package 100 in examples of the present disclosure. OVF package 100 includes a multitier application blueprint 102 that describes dependencies between software components of a multitier application on VMs deployed from the OVF package. An example of a multitier application is a three-tier application that includes a front-end web server, a mid-level application server, and a back-end database including a database server and data sets. OVF package 100 is deployed to create the VMs, such as Web_VM, App_VM, and DB_VM. The software components, such as Apache, Tomcat, My_App in Tomcat, and MySQL, are then deployed to the VMs based on the multitier application blueprint. Deploying a software component includes any combination of installing, configuring, starting, stopping, and updating the software component. OVF package 100 includes an OVF descriptor 104, a manifest 106, a certificate 108, and one or more disk image files 110.

FIG. 2 is a table listing multitier application blueprint 102 in examples of the present disclosure. Blueprint 100 includes nodes that represent VMs. For example, blueprint 102 includes nodes named Web Server, App Server, and Database Server. A node optionally describes VM-level information, such as CPU, memory, and cluster size. The parameters here may override the parameters in the OVF descriptor.

A service-node-component may be nested under a node. The service-node-component represents a server on a VM. For example, blueprint 102 includes Apache web server on the node named Web Server, a Tomcat application server on the node named App Server, and a MySQL database server on the node named Database Server. The service-node-component describes service-level information.

An application-node-component may be nested under a service-node-component. The application-node-component represents an application installed into an application server. For example, a My_App application is installed into the Tomcat application server. The application may be packed as a EAR, JAR, Script, or WAR file. The application-node-component describes application-level information.

A component-action may be nested under a service-node component or an application-node-component. The component-action describes specific phases such as install, configure, start, stop, and update.

A node-component-dependency may be nested under a service-node component, an application-node-component, or a component-action segment. When nested under a service or application, the node-component-dependency specifies another service or application that should fully deploy before the service or application. When nested under an action of a service or application, the node-component dependency specifies a preceding service or application that should fully deploy before the action of the service of application. For example, as illustrated in FIG. 1, the Apache web server depends on the My_App application, which depends on the MySQL database server. Note that My_App implicitly depends on the Tomcat application server because My_App is installed into the Tomcat application server but Tomcat and MySQL may be deployed in parallel.

FIG. 3 is a block diagram of a virtualized computing environment 300 in examples of the present disclosure. Environment 300 includes a host computer 302, also referred to as a host. Host 302 runs a hypervisor 304 to create and run VMs. Host 302 includes suitable hardware 306 (physical memory, processor, local storage, and network interface cards) to support the VMs. Host 302 stores the VM data in a datastore 308. Host 302 may be part of a cluster of multiple hosts (not shown) that share their resources. A virtualization manager 310 centrally manages virtual and physical objects in environment 300, such as VMs, clusters, and hosts. A web client 312 is used to access virtualization manager 310. Alternatively, a client 314 directly manages virtual and physical objects in environment 300.

Web client 312 or client 314 uses an OVF tool to deploy (import) OVF package 100 to environment 300. The OVF tool may be part of virtualization manager 310 or a stand-alone program. OVF package 100 may be accessed remotely over a network or locally within environment 300. OVF package 100 may be deployed to create VMs 318, 320, and 322 on host 302 or a cluster of hosts (not shown), with the latter made possible through virtualization manager 310. VMs 318, 320, and 322 have respective guest OS's 324, 326, and 328. Each VM further includes an agent 344 for an application orchestration server 332.

As part of the deployment process, the OVF tool may prompt for dynamic deployment parameters. A dynamic deployment parameter may be any configuration parameter received. For example, the dynamic deployment parameters include static IP addresses for VMs 318, 320, and 322, a password for accessing database server, and IP addresses for an application configuration server 330 and an application orchestration server 332 later used to deploy software on the VMs. The OVF tool stores the dynamic deployment parameters as well as blueprint 102 in a VM configuration files, such as .vmx files, for VMs 318, 320, and 322.

In some examples of the present disclosure, OVF package 100 may include separate disk image files for VMs 318, 320, and 322. A VM's disk image file may capture a software component for the VM in one of the following states: not installed, installed but not updated, or updated but not configured. When a software component for a VM is not installed, the VM's disk image file may include executable installation files of the software component. In other examples of the present disclosure, OVF package 100 may include a template disk image with only a guest OS installed in order to reduce the size of the OVF package. The template disk image is shared by VMs 318, 320, and 322, and software components are installed on the VMs pursuant to blueprint 102.

On each VM, its agent 344 reads blueprint 102 and the IP addresses of configuration server 330 and orchestration server 322 from the VMs' configuration file, parses a portion of the blueprint relevant to the software components on the VM, and sends the parsed portion to the application orchestration server. Application orchestration server 332 uses application configuration server 330 to deploy the software components on VMs 318, 320, and 322 based on the dependencies specified in blueprint 102. For example, application orchestration server 332 controls application configuration server 330 to deploy MySQL database server 340 and Tomcat application server 336 first, then My_App application 338 in Tomcat application server 336, and lastly Apache web server 334. Note that MySQL database server 340 and Tomcat application server 336 may be deployed in parallel.

Deploying a software component includes any combination of installing, configuring, starting, stopping, and updating the software components.

Application configuration server 330 may access a repository for the executable installation files for the software components. Alternatively, as discussed above, the executable installation files may be included in the disk image files for VMs 318, 320, 322. Together, Apache web server 334 on VM 318, My_App application 338 in the Tomcat application server 336 on VM 320, and a MySQL database server 340 on VM 322 form a multitier application 342, also referred to as a vApp.

Figure 4:
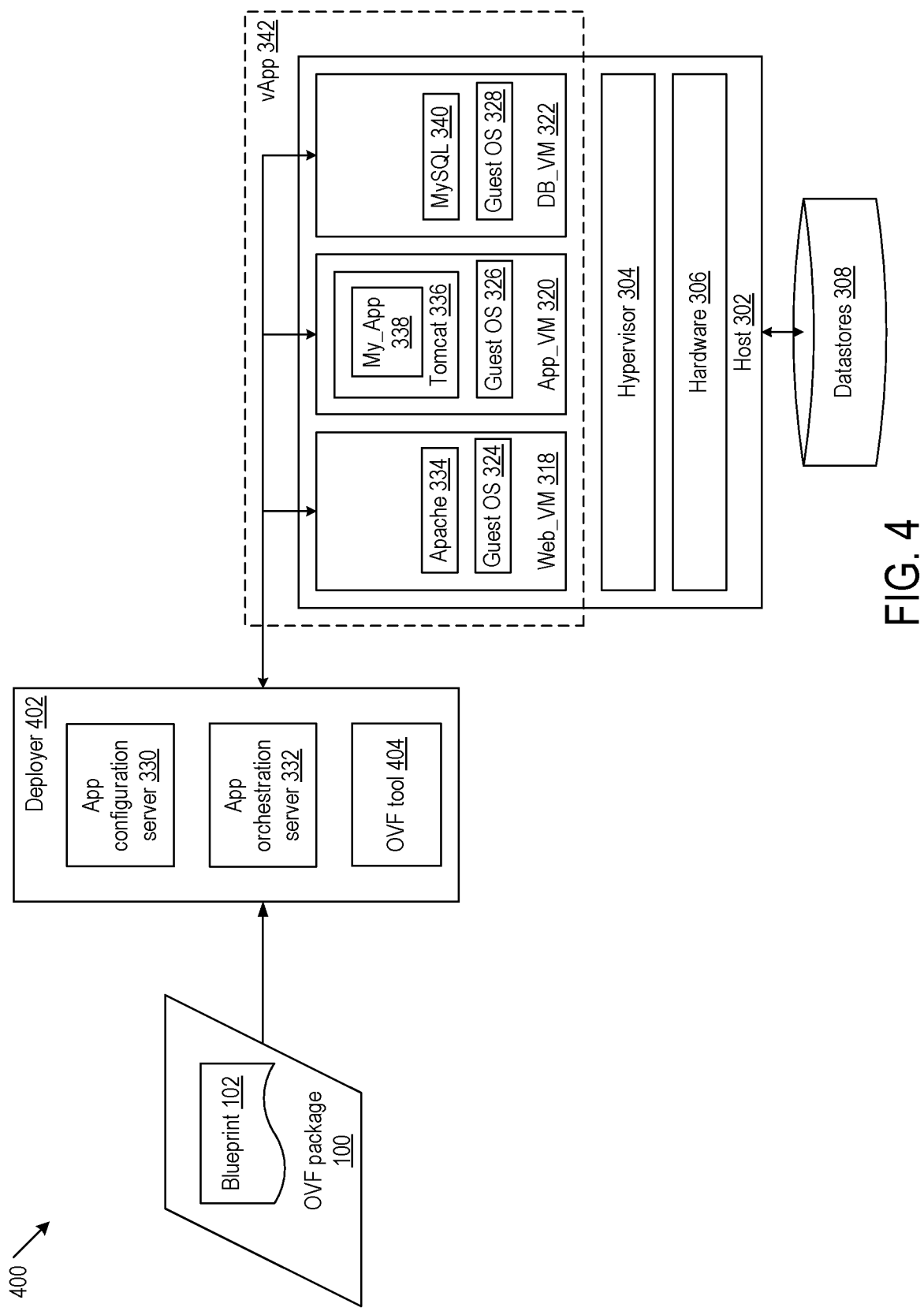
FIG. 4 is a block diagram of a virtualized computing environment in other examples of the present disclosure.

FIG. 4 is a block diagram of a virtualized computing environment 400 in examples of the present disclosure. Environment 400 is similar to environment 300 (FIG. 3) except for the additional of a deployer 402 that includes application configuration server 330, application orchestration server 332, and an OVF tool 404. Deployer 402 integrates the functionalities of configuration server 330, orchestration server 332, and an OVF tool 404 and eliminates the need for agents 334 (FIG. 3) in VMs 318, 320, and 332.

Deployer 402 uses OVF tool 404 to deploy OVF package 100 to create VMs 318, 320, and 332 on host 302 or a cluster of hosts (not shown). As part of the deployment process, OVF tool 404 may prompt for dynamic deployment parameters and stores the dynamic deployment parameters in a VM configuration files, such as .vmx files, for VMs 318, 320, and 322. However, OVF tool 404 no longer needs to store IP addresses of configuration server 330 and orchestration server 332 as well as blueprint 102 in the VM configuration files because these servers are now part of deployer 402 that directly receives OVF package 100. Deployer 402 extracts blueprint 102 from OVF package 100 and provides it to orchestration server 332, which then uses configuration server 330 to deploy the software components on VMs 318, 320, and 322 based on the dependencies specified in blueprint 102.

Figure 5:
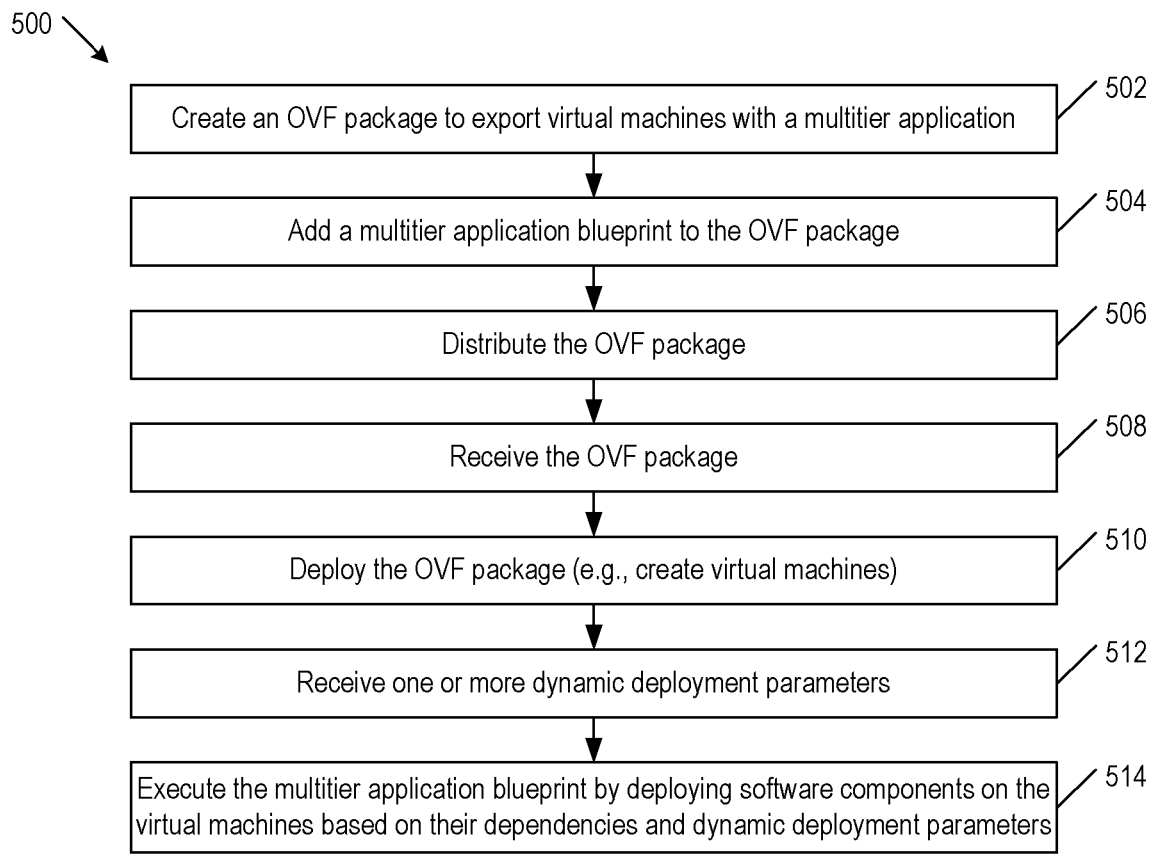
FIG. 5 is a block diagram of a method to deploy a multitier application in the virtualized computing environment of FIG. 3 or FIG. 4 in examples of the present disclosure.

FIG. 5 is a block diagram of a method 500 to deploy multitier application 342 in virtualized computing environment 300 or 400 (FIG. 3 or 4) in examples of the present disclosure. Method 500 may be implemented as instructions encoded on a computer-readable medium that is to be executed by a processor. Method 500 may begin in block 502.

In block 502, OVF package 100 (FIG. 1) is created to export virtual machines 318, 320, and 323 with multitier application 342. Block 502 may be followed by block 504.

In block 504, multitier application blueprint 102 (FIG. 1) is created and added to OVF package 100. As part of this process, OVF descriptor 104, manifest 106, and certificate 108 (FIG. 1) are updated. Block 504 may be followed by block 506.

In block 506, OVF package 100 is distributed. For example, OVF package 100 may be made accessible on a network or a copy of the OVF package in a computer-readable medium may be physically transported. Block 506 may be followed by block 508.

In block 508, OVF package 100 is received. For example, OVF package 100 may be accessed remotely or stored locally in virtualized computing environment 300 or 400. Block 508 may be followed by block 510.

In block 510, OVF package 100 is deployed to host 302 or a cluster of hosts (not shown). As discussed above, OVF package 100 may be deployed using web client 312 (FIG. 3), client 314 (FIG. 3), or deployer 402 (FIG. 4). As a result, VMs 318 with guest OS 334, VM 320 with guest OS 326, and VM 322 with guest OS 328 are created. Depending on their disk image files, the software components on VMs 318, 320, and 322 may not be installed, installed but not updated, or updated but not configured. Block 510 may be followed by block 512.

In block 512, one or more dynamic deployment parameters may be received as part of the deployment process. The dynamic deployment parameters may be any configuration parameters received from a user. Block 512 may be followed by block 514.

In block 514, multitier application blueprint 102 is executed to deploy the software components on VMs 318, 320, and 322. As discussed above, orchestration server 332 uses configuration server 330 to deploy the software components to VMs 318, 320, and 332 based on the dependencies in blueprint 102. As part of the deployment, configuration server 330 and orchestration server 332 uses a number of the dynamic deployment parameters.

In one use case when OVF package 100 includes a template disk image with only a guest OS installed, the dynamic deployment parameters include a service to be installed on each of the VMs 318, 320, and 330. During software deployment, orchestration server 332 uses configuration server 330 to install the requested services on VMs 318, 320, and 322.

In another use case, multitier application 342 is an existing application located in one environment or cloud platform 300. Multitier application 342 is exported with application-level information in OVF package 100 to another environment or cloud platform.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to deploy a multitier application in a virtualized computing environment, comprising:
receiving an open virtualization format (OVF) package comprising:
an OVF descriptor;
one or more virtual disk image files of virtual machines; and
an existing multitier application blueprint specifying software components of the multitier application on the virtual machines and dependencies of the software components,
wherein the one or more virtual disk image files are associated with updated states of the software components on the virtual machines;
deploying the virtual machines based on the one or more virtual disk image files, the virtual machines forming nodes of the multitier application; and
executing the existing multitier application blueprint extracted from the OVF package to deploy the software components on the virtual machines based on the dependencies of the software components and the updated states associated with the one or more virtual disk image files.

2. The method of claim 1, wherein the multitier application blueprint comprises, for at least one node:
a node property element specifying virtual machine properties;
a service-node-component element specifying a service component on the node and service component's properties;
an application-node-component element specifying an application component on the node and the application component's properties;
a component-action element specifying a deployment phase; and
a node-component-dependency element specifying a dependency on another service component or another application component.

3. The method of claim 1, wherein executing the multitier application blueprint comprises utilizing an application configuration server to install, configure, start, stop, or update the software components on the virtual machines.

4. The method of claim 3, wherein executing the multitier application blueprint comprises utilizing an application orchestration server control the application configuration server based on the dependences of the software components.

5. The method of claim 1, wherein:
the one or more virtual disk image files includes a virtual machine template; and
deploying the virtual machines comprises creating the virtual machines from the virtual machine template.

6. The method of claim 1, wherein deploying the virtual machines comprises prompting for and receiving a dynamic deployment parameter.

7. The method of claim 6, wherein:
prompting for the dynamic deployment parameter comprises prompting for a selection of a service component from a plurality of service components; and
the method further includes installing the selected service component on a virtual machine.

8. The method of claim 6, wherein:
the dynamic deployment parameter comprises a port, an IP address, or a password; and
executing the multitier application blueprint further comprises configuring a software component with the dynamic deployment parameter.

9. The method of claim 1, further comprising creating the OVF package to export the multitier application on existing virtual machines from a first cloud platform, wherein receiving the OVF package, deploying the virtual machines, and executing the multitier application blueprint comprise importing the multitier application to a second cloud platform.

10. The method of claim 1, wherein the software components are deployed on the virtual machines in a sequence based on the dependencies of the software components.

11. A non-transitory, computer-readable storage medium encoded with instructions executable by a processor to deploy a multitier application in a virtualized computing environment by:
receiving an open virtualization format (OVF) package comprising:
an OVF descriptor;
one or more virtual disk image files of virtual machines; and
an existing multitier application blueprint specifying software components of the multitier application on the virtual machines and dependencies of the software components
wherein the one or more virtual disk image files are associated with updated states of the software components on the virtual machines;

deploying the virtual machines based on the one or more virtual disk image files, the virtual machines forming nodes of the multitier application; and executing the existing multitier application blueprint extracted from the OVF package to deploy the software components on the virtual machines based on the dependencies of the software components and the updated states associated with the one or more virtual disk image files.

12. The storage medium of claim 11, wherein the multitier application blueprint comprises, for at least one node:

a node property element specifying virtual machine properties;

a service-node-component element specifying a service component on the node and service component's properties;

an application-node-component element specifying an application component on the node and the application component's properties;

a component-action element specifying a deployment phase; and a node-component-dependency element specifying a dependency on another service component or another application component.

13. The storage medium of claim 11, wherein executing the multitier application blueprint comprises utilizing an application configuration server to install, configure, start, stop, or update the software components on the virtual machines.

14. The storage medium of claim 13, wherein executing the multitier application blueprint comprises utilizing an application orchestration server control the application configuration server based on the dependences of the software components.

15. The storage medium of claim 11, wherein:

the one or more virtual disk image files includes a virtual machine template; and deploying the virtual machines comprises creating the virtual machines from the virtual machine template.

16. The storage medium of claim 11, wherein deploying the virtual machines comprises prompting for and receiving a dynamic deployment parameter.

17. The storage medium of claim 16, wherein:

prompting for the dynamic deployment parameter comprises prompting for a selection of a service component from a plurality of service components; and the method further includes installing the selected service component on a virtual machine.

18. The storage medium of claim 16, wherein:

the dynamic deployment parameter comprises a port, an IP address, or a password; and executing the multitier application blueprint further comprises configuring a software component with the dynamic deployment parameter.

19. The storage medium of claim 11, further comprising creating the OVF package to export the multitier application on existing virtual machines from a first cloud platform, wherein receiving the OVF package, deploying the virtual machines, and executing the multitier application blueprint comprise importing the multitier application to a second cloud platform.

* * * * *